United States Patent [19]

Hays

[11] Patent Number: 5,059,249

[45] Date of Patent: * Oct. 22, 1991

[54] PROCESS FOR DISPERSING ORGANIC PIGMENTS WITH ULTRASONIC RADIATION

[75] Inventor: Byron G. Hays, Verona, N.J.

[73] Assignee: BASF Corp., Parsippany, N.J.

[*] Notice: The portion of the term of this patent subsequent to May 29, 2007 has been disclaimed.

[21] Appl. No.: 477,336

[22] Filed: Feb. 8, 1990

Related U.S. Application Data

[63] Continuation-in-part of Ser. No. 312,870, Feb. 21, 1989, Pat. No. 4,929,279.

[51] Int. Cl.$^5$ .............................................. C09B 67/50
[52] U.S. Cl. .................................... 106/412; 106/413; 106/499; 106/504; 252/547
[58] Field of Search ................ 106/412, 413, 499, 504; 252/547

[56] References Cited

U.S. PATENT DOCUMENTS

| | | | |
|---|---|---|---|
| 3,079,436 | 2/1963 | Hwa | 252/547 |
| 3,249,453 | 7/1962 | Schnoring et al. | 106/494 |
| 4,665,107 | 5/1987 | Micale | 8/527 |
| 4,929,279 | 5/1990 | Hays | 106/412 |

Primary Examiner—William R. Dixon, Jr.
Assistant Examiner—Deborah Jones
Attorney, Agent, or Firm—M. R. Chipaloski; R. P. Hurley

[57] ABSTRACT

Dispersions of organic pigments are produced by adding a surfactant to an aqueous slurry of an organic pigment followed by subjecting the slurry to ultrasonic radiation. The surfactant utilized is one or more of the surfactants selected from the group consisting of: various specific acidic or quaternary salts of alkyl substituted propanediamines, and derivatives thereof, as well as a poly(ethyleneoxide) ether of an 18 carbon alcohol having 9 units of ethylene oxide thereon.

26 Claims, No Drawings

PROCESS FOR DISPERSING ORGANIC PIGMENTS WITH ULTRASONIC RADIATION

This application is a continuation-in-part of application Ser. No. 07/312,870, filed Feb. 21, 1989, now U.S. Pat. No. 4,929,279.

The present invention pertains to a process for making dispersions of particulate materials. More specifically, the invention relates to dispersing organic pigments. The method utilized ultrasonic energy in combination with specific organic dispersing agents.

Several U.S. patents are related to the present invention. Below is a discussion of the most closely related patents presently known to the inventor.

U.S. Pat. No. 4,665,107 (hereinafter the '107 patent) describes a method for producing a colorant comprising a stable aqueous suspension by emulsifying a mixture of (a) an organic solvent, (b) a polymer soluble in the organic solvent, and (c) a pigment, the mixture of (a)-(c) being emulsified in water containing a surfactant. In the '107 patent, the pigment is dispersed in the organic solvent with an ultrasonic probe. The pigment/organic solvent mixture is then combined with a water/surfactant mixture and an emulsion of the organic solvent mixture is made using the ultrasonic probe. The '107 patent mentions a variety of surfactants, including Aerosol OT-75, Surfynol TG, Katapone VV, Aonyl FSN, Span 60, Lipal 4LA, and lecithin. In contrast to the '107 patent, the process of the present invention utilizes one or more members of a group of surfactants, the members of this group being different from the surfactants listed in the '107 patent. In further contrast to the '107 patent, the process of the present invention does not require the use of a solvent.

U.S. Pat. No. 4,701,218 (hereinafter the '208 patent) relates to both dry, free-flowing floccular compositions of ultrafine particles as well as to a method of making free-flowing floccular compositions of ultrafine particles. The method may utilize any of a large group of surfactants including non-ionics, anionics or cationics (see column 3, lines 21–27), and the collodial dispersion of the particles may be made by a variety of conventional agitation techniques, such as ultrasonic vibrations and rapid stirring. In contrast to the '218 patent, the process of the present invention requires that one or more of a specific group of surfactants be utilized along with ultrasonic dispersion.

U.S. Pat. No. 4,588,576 (hereinafter the '576 patent) relates to a process for the production of microcrystalline metal oxide powder by forming a solution of a zirconium metalorganic compound followed by subjecting the solution to ultrasonic wave energy, etc. Column 4, lines 14–19 of the '576 patent state that a surfactant is employed in the solution forming step, i.e. prior to exposing the solution to ultrasonic radiation. Column 5, lines 33–50 lists a large number of suitable surfactants, among which listing are quaternary ammonium salts. The present invention differs from the '576 patent in many ways, not the least of which is that the pigments dispersed in the process of the present invention are organic pigments, whereas the pigments mentioned in the '576 patent are inorganic pigments. Furthermore, the process of the present invention applies to a specific set of surfactants.

BRIEF SUMMARY OF THE INVENTION

The present invention is a process of dispersing an organic pigment. The method is carried out by first adding a surfactant to an aqueous slurry of an organic pigment. The surfactant is at least one member selected from the group consisting of:
1. an acidic salt of N-alkyl-N,N',N'-trimethyl-1,3-propanediamine, wherein the alkyl group contains from about 12 to about 22 carbon atoms, as well as triethyl and tripropyl derivatives thereof;
2. an acidic salt of N-alkyl-N,N',N'-tris(2-hydroxypropyl)-1,3-propanediamine, wherein the alkyl group contains from about 12 to about 22 carbon atoms, as well as 2-hydroxyethyl and 2-hydroxybutyl derivatives thereof;
3. a quaternary salt of N-alkyl-N,N,N',N',N'-pentamethyl-1,3-propanediamine, wherein the alkyl group contains from about 12 to about 22 carbon atoms, as well as pentaethyl and pentapropyl derivatives thereof;
4. an acidic salt of N-alkyl-N'-(3-aminopropane)-1,3-propanediamine, wherein the alkyl group contains from about 12 to about 22 carbon atoms, as well as tetramethyl, tetraethyl, tetrapropyl, tetrakis(2-hydroxyethyl), tetrakis(2-hydroxypropyl), tetrakis(2-hydroxybutyl), heptamethyl, heptaethyl, and heptapropyl derivatives thereof;
5. an acidic salt of N-alkyl-N-(3-aminopropane)-1,3-propanediamine, wherein the alkyl group contains from about 12 to about 22 carbon atoms, as well as tetramethyl, tetraethyl, tetrapropyl, tetrakis(2-hydroxyethyl), tetrakis(2-hydroxypropyl), tetrakis(2-hydroxybutyl), heptamethyl, heptaethyl, and heptapropyl derivatives thereof;
6. the acidic salt of N-(N-alkyl-3-aminopropane)-N'-(3-aminopropane)-1,3-propanediamine, wherein the alkyl group contains from about 12 to about 22 carbon atoms, as well as pentamethyl, pentaethyl, pentapropyl, pentakis(2-hydroxyethyl), pentakis(2-hydroxypropyl), pentakis(2-hydroxybutyl), nonamethyl, nonaethyl, and nonapropyl derivatives thereof;
7. a poly(ethyleneoxide) ether of an 18 carbon alcohol having 9 units of ethylene oxide thereon.

The method of the present invention pertains to the addition of at least one member (of the above-listed group of surfactants) to an aqueous slurry of an organic pigment, following which the pigment is dispersed by subjecting the slurry to ultrasonic radiation. Most of the surfactants (i.e. 1 through 7, above) are acidic salts of specific amines as well as salts of derivatives of those amines. These acidic salts were prepared by stirring and heating the amine in dilute acid, to yield clear solutions. The acids used can include: acetic acid, hydrochloric acid, sulfuric acid, formic acid, and hydrobromic acid. The pigment is then dispersed by subjecting the slurry to ultrasonic radiation. Numerous surfactants have been tested for effectiveness when using ultrasonic irradiation as the method of dispersion, and the above-named surfactants were unexpectedly found to produce superior results. In order to enable the filtration and washing of presscakes, any member within the six categories of amine surfactants (i.e. 1 through 6, above) mentioned above would be preferable to the quaternary ammonium salt. The easiest method for deactivation of the quaternary ammonium salt is via precipitation with a large anion (e.g. a polynaphthalene sulfonate/formaldehyde condensate), which adds extra weight and dilutes the strength of the pigment. In contrast, the acidic ammonium salts can be deactivated in the acidic pigment slurries by addition of sufficient alkali. Unlike the addition of a large anion to precipitate the quaternary ammonium cation, the addition of alkali to neutralize the ammonium salts does not further extend the pigment and dilute the pigment strength. The nonionic surfactant can be deactivated by addition of the salt (e.g., ammonium or sodium) of a polyacrylic acid or acrylic acid copolymer, followed by addition of sufficient acid.

A member within each of the above seven groups of surfactants is as follows: (1) Duomeen ® TTM is N-tallowalkyl-N,N',N'-trimethyl-1,3-propanediamine; (2) Propoduomeen ® T/13 is N-tallowalkyl-N,N',N'-tris(2-hydroxypropyl)-1,3-propanediamine; (3) Duoquad ® T-50 is N-tallowalkyl-N,N,N',N',N'-pentamethyl-1,3-propanediamine dichloride (4) Jetamine ® TRT is N-tallowalkyl-N'-(3-aminopropane)-1,3-propanediamine; (5) Lilamin ® LSP-33 is N-tallowalkyl-N-(3-aminopropane)-1,3-propanediamine; (6) Jetamine ® TET is N-(N-tallowalkyl-3-aminopropane)-N'-(3-aminopropane)-1,3-propanediamine; (7) Chemal ® OA-9 is a poly(ethyleneoxide) ether of an 18 carbon alcohol having 9 units of ethylene oxide thereon.

DETAILED DESCRIPTION OF THE PREFERRED EMBODIMENTS

It is highly desirable, when making dispersions of very small particulates, to prevent and/or reduce flocculation of the particulates to as great a degree as possible. In the case of pigments, it is desirable to prevent flocculation in order to maintain the strength of the pigment dispersion as well as to decrease undesirable side effects which accompany pigment flocculation, such as "flooding" of inks or paints containing more than one pigment (e.g. copper phthalocyanine blue and titanium dioxide). The most advantageous result of good pigment dispersion is retention of high pigment strength. Higher pigment strength translates into higher pigment dollar value, as the same mass of colored particles, deflocculated to a greater degree, becomes more valuable per unit mass, because the deflocculated particles impart greater tinting strength or coloring capacity per unit mass of colored particles. As a result, a lesser amount of the higher strength pigment dispersion can be used to achieve a required level of tinting strength or coloring capacity.

In order to make a highly deflocculated pigment dispersion, it has heretofore been necessary to expend large amounts of energy to impart a high degree of shear to the pigment flocculates and agglomerates. Generally, the high shear has been imparted by high-powered devices such as shot mills which grind or otherwise agitate the pigment dispersion with high energy, or by lower energy devices such as ball mills which grind the pigment dispersion for a relatively long time—e.g. 24 to 72 or more hours. Ultrasonic irradiation, although generally recognized as a means of pigment dispersion, has not heretofore been recognized as a superior means of pigment dispersion. The inventor of the present process has unexpectedly discovered that ultrasonic irradiation, when used in combination with one or more members of a group of surfactants, produces a desired degree of dispersion of pigment in less time, and with less energy than any other currently known method of pigment dispersion. Furthermore, this method of dispersion does not require separation of the finished dispersion from the grinding media (e.g., steel shot, sand, pebbles or balls) used in the usual methods of dispersion.

As described in U.S. Pat. No. 4,588,576, ultrasonic wave energy can be provided by any conventional system, such as an aqueous bath equipped with a source of high frequency vibrations. Any acoustic generator can be employed, e.g. a piezoelectric type generator, a mechanical generator, or a magnetorestrictive type. Generally, ultrasonic radiation includes frequencies from about 15 kilohertz to about 20,000 kilohertz. The frequency range of between about 15 kilohertz and 3,000 kilohertz is the most suitable in the process of the present invention. Most preferred is the 40–2,000 kilohertz range. In general, the ultrasonic intensity used can be within the range of about 20 watts/cm$^2$ and 500 watts/cm$^2$.

The process of the present invention is applicable to all organic pigments. More specifically, the term organic pigments is meant to include nitroso pigments, monoazo pigments, disazo pigments, disazo condensation pigments, basic dye pigments, alkali blue pigments, Peacock blue lake pigments, phloxine pigments, quinacridone pigments, lake pigments of Acid Yellow 1 and 3, carbazole dioxazine violet pigments, alizarine lake pigments, vat pigments, phthalocyanine pigments, carmine lake pigments, tetrachloroisoindolinone pigments and carbon black pigments. Preferably the organic pigment is selected from the group consisting of monoazo, disazo, phthalocyanine and carbon black pigments. Most preferably the organic pigment is selected from the group consisting of acetoacetanilide (AAA) diarylide yellow (Pigment Yellow 12), copper phthalocyanine blue (Pigment Blue 15), carbon black (Pigment Black 7) and barium Lithol ® red (Pigment Red 49).

Examples 1–52 involve the dispersion of AAA Yellow pigments. Examples 1–52 each involve the use of a AAA Yellow strike slurry as a starting material. The AAA Yellow strike slurries were prepared as follows.

Tetrazotized 3,3'-dichlorobenzidine (DCB) was prepared by stirring DCB dihydrochloride in an ice/hydrochloric acid slurry with a slight stoichiometric excess of sodium nitrite. The stirring was continued for about one hour at 0°–5° C. Excess nitrous acid was eliminated with sulfamic acid, giving approximately 0.5 molar DCB tetrazo. 0.25 molar DCB tetrazo was produced by the addition of an equal volume of ice water.

For the statistically designed experiments, sufficient acetoacetanilide (AAA) for four strikes was dissolved in dilute caustic solution, split into four equal parts and reprecipitated with acetic acid to pH 6. For the pH 6→pH 3.5 strike, a 19:1 molar ratio of sodium acetate:AAA was used. For constant pH strikes, a 1:1 molar ratio of sodium acetate:AAA was used, with 10 weight percent sodium hydroxide being added continuously to maintain pH during striking.

In the statistically designed experiments, two strikes were performed simultaneously, using a Cole-Palmer Masterflex tubing pump, the pump being fitted with two heads and size 14 tubing. The pump was set to deliver 3–4 ml/minute DCB tetrazo at a constant rate. Striking was continued until there was only a slight excess of AAA. The strike slurries were then treated with a 10 weight percent Duoquad ® T solution, added at various levels based on the amount of AAA Yellow present after striking.

It is preferred that the process of the present invention be carried out using the surfactant in an amount between 2 percent, on weight of pigment, and 100 percent, on weight of pigment. It is more preferred that the surfactant is present in an amount between 5 percent, on weight of pigment, and 85 percent, on weight of pigment. For transparent pigments, it is preferred that the surfactant is present in an amount between 10 percent, on weight of pigment, and 30 percent, on weight of pigment. For opaque pigments it is preferred that the surfactant is present in an amount between 5 percent, on weight pigment, and 10 percent, on weight of pigment. In contrast, it is preferred that the surfactant is present in an amount between 50 percent, on weight of pigment, and 90 percent, on weight of pigment, if the dispersion process is being carried out during the striking of the pigment.

EXAMPLES 1-8 (COMPARATIVE)

Pigment dispersions were made via several methods, for comparative purposes. A variety of dispersion techniques, other than ultrasonic techniques, are given in Table I, below. Each of the methods utilized in Table I began with a freshly-prepared AAA Diarylide Yellow (Pigment Yellow 12) strike slurry which had been treated with 30 percent, based on weight of pigment, of N-tallow-alkyl-N,N,N',N',N'-pentamethyl dichloride. Table I gives dispersion conditions in the middle column, while the right column of Table I indicates the mean diameter (in nanometers, nm) of the particulate material in the slurry. The mean diameter was measured by diluting the strike slurry 1:400 with distilled water, placing the diluted slurry in a sample cuvettes and determining the mean diameter with a Coulter Electronics Submicron Particle Size Analyzer Model N-4. Three values are listed because the mean diameter measurement was performed 3 times on each sample, at intervals of approximately 4 minutes. The results were printed out on an Axiom printer. The best combination of high shear mechanical dispersion and oven aging produced mean diameters of about 120 nm.

TABLE I

Mean Diameter of AAA Yellow Slurry Dispersed Under Different Conditions

| Example | Dispersion Conditions | Mean Diameter (nm) |
|---|---|---|
| 1 | None | 5500 |
| 2 | Boiled for 2 hours | 204; 202; 207 |
| 3 | Boiled for 8 hours | 164; 167; 173 |
| 4 | Stored at 80° for 16 hours | 180; 176; 178 |
| 5 | Stored at 60° for 16 hours | 141; 158; 166 |
| 6 | Stored at 20° C. for 24 hours, then dispersed under high shear in a Kinematica (Kriens-Luzern) CH-6010 mixer for two minutes. | 245; 247; 249 |
| 7 | Same as #6, except stored at 60° C. for 24 hours. | 121; 125; 132 |
| 8 | Same as #6, except stored at 60° C. for 96 hours. | 125; 133; 145 |

EXAMPLES 9-14

Examples 9-14 illustrate the effects of several conditions for dispersing the AAA Yellow strike slurry (of Examples 1-8) with ultrasonic irradiation. In these Examples, the AAA Yellow strike slurry was treated with 30 percent based on weight of AAA Yellow of Duoquad ® T (i.e. N-tallow alkyl-N,N,N',N',N'-pentamethyl-1,3-propanediamine dichloride). About 25 gram aliquots of these slurries were put into one-ounce jars, which were capped and placed in the ultrasonic device containing some water. Ice was intermittently added to the water in order to maintain a temperature of 20° C. The ultrasonic device employed was a 300 W Cole-Palmer Branson Ultrasonic Cleaner Model B-321. As can be seen in Table II, ultrasonic dispersion at elevated temperature (i.e. 60° C.) and for extended periods (i.e. 1.5-4.5 hours) produced relatively stable dispersions of significantly lower mean diameters (70-100 nm) in comparison with Examples 1-8.

TABLE II

Mean Diameters of AAA Yellow Slurry Ultrasonically Dispersed Under Various Conditions

| Example | Ultrasonic Dispersion Conditions | Mean Diameter (nm) |
|---|---|---|
| 9 | 1.5 hours at 20° C. | 257; 305; 338 |
| 10 | 1.5 hours at 60° C. | 99; 105; 109 |
| 11 | 1.5 hours at 60° C., then stored at 20° C. for 13 hours | 109; 109; 110 |
| 12 | 1.5 hours at 60° C., stored at 20° C. for 13 hours, then irradiated for 1.5 additional hours at 60° C. | 81; 83; 84 |
| 13 | 1.5 hours at 60° C., stored at 20° C. for 48 hours, then irradiated for 1.5 additional hours at 60° C. | 75; 76; 77 |
| 14 | 1.5 hours at 60° C., stored at 20° C. for 48 hours, then irradiated for 3 additional hours at 60° C. | 70; 72; 72 |

EXAMPLES 15-23

Examples 15-23 illustrate the effects of post-treating the AAA Yellow strike slurry with various levels of Duoquad ®T and ultrasonically dispersing the pigmentary material at two elevated temperatures. Table III provides the level of surfactant, the dispersion conditions, and the mean particle diameter after dispersion. In general, Table III illustrates that at 60° C. 30 weight percent Duoquad ®T produced slightly greater dispersion (i.e. lower mean diameters) than did 20 weight percent Duoquad ®T or 50 weight percent Duoquad ®T. However, at 80° C., 20 weight percent Duoquad ®T was more effective. Furthermore, Table III indicates that ultrasonic dispersion at 60° gave significantly lower mean diameters than ultrasonic dispersion at 80° C. The ultrasonic dispersion method employed was the same as in Examples 9-14, as was the method for measurement of mean particle diameter.

TABLE III

Mean Diameters of AAA Yellow Slurry Treated And Ultrasonically Dispersed Under Various Conditions

| Example | Treatment Level of Duoquad ® T (wt %) | Ultrasonic Dispersion Conditions | Mean Diameter (nm) |
|---|---|---|---|
| 15 | 20 | 1.5 hours at 80° C. | 137; 143; 145 |
| 16 | 20 | 3.0 hours at 80° C. | 131; 137; 142 |
| 17 | 20 | 1.5 hours at 60° C. | 105; 107; 111 |
| 18 | 30 | 1.5 hours at 80° C. | 202; 226; 218 |
| 19 | 30 | 3.0 hours at 80° C. | 180; 202; 206 |
| 20 | 30 | 1.5 hours at 60° C. | 95; 99; 101 |
| 21 | 50 | 1.5 hours at 80° C. | 169; 177; 177 |
| 22 | 50 | 3.0 hours at 80° C. | 156; 173; 176 |
| 23 | 50 | 1.5 hours at 60° C. | 111; 114; 114 |

EXAMPLES 24-30

A freshly-prepared AAA yellow strike slurry was ultrasonically dispersed at different temperatures in order to find an optimum temperature for the ultrasonic dispersion process. The AAA Yellow strike slurry was treated with 20 percent (on weight of pigment) of Duoquad ®T, following which the slurry/surfactant mixture was stored at 20° for three days before the ultrasonic irradiation was performed. Ultrasonic irradiation was applied to each of the samples for a period of 1.5 hours with temperatures being maintained by addition of ice and water. As shown in Table IV, the lowest mean diameter was obtained at 70° C. Just as in Examples 9-14, the ultrasonic device employed was a 300 W Cole-Palmer Branson Ultrasonic Cleaner Model B-321, and the mean particle diameter was determined with a Coulter Electronics submicron Particle Size Analyzer model N-4.

TABLE IV

Mean Diameters of AAA Yellow Slurry Ultrasonically Dispersed at Different Temperatures

| Example Number | Temperature During Ultrasonic Dispersion (°C.) | Mean Diameter (nm) |
|---|---|---|
| 24 | 20 | 117; 124; 125 |
| 25 | 30 | 130; 136; 140 |
| 26 | 40 | 111; 116; 116 |
| 27 | 50 | 83; 86; 88 |
| 28 | 60 | 76; 80; 80 |
| 29 | 70 | 68; 70; 69 |
| 30 | 80 | 80; 81; 82 |

EXAMPLES 31-34

Examples 31-34 illustrate the effects of striking time and molarity of 3,3'-dichlorobenzidine tetrazo on the mean diameters of AAA Yellow slurries, struck at 20° C., treated with 30 percent Duoquad ®T, and ultrasonically dispersed at 65°-70° C. for 3 hours. Table V provides the results of Examples 31-34. As can be seen in Table V, striking the AAA Yellow over a 50 minute period gave significantly lower mean particle diameters than striking over a 110 minute period. Furthermore, use of a more dilute (0.25 molar) 3,3' dichlorobenzidine tetrazo gave slightly lower mean particle diameters. Mean particle diameter was measured as described in Examples 9-14, and the ultrasonic device utilized was the same as described in Examples 9-14.

TABLE V

Mean Diameters Of AAA Yellow Slurries: Effects of DCB Tetrazo Concentration and Strike Time

| Example Number | DCB Tetrazo Concentration (molarity) | Striking Time (minutes) | Mean Diameter (nm) |
|---|---|---|---|
| 31 | 0.5 | 50 | 75; 78; 79 |
| 32 | 0.25 | 50 | 65; 66; 66 |
| 33 | 0.5 | 110 | 94; 100; 104 |
| 34 | 0.25 | 110 | 95; 88; 88 |

EXAMPLES 35-42

Examples 35-42, the results of which are given in Table VI, illustrate the effects of striking pH and striking time on particulate diameter. The AAA Yellow slurries were struck at 20° C., treated with Duoquad ®T and then ultrasonically dispersed at 65°-70° C. for 4.5 hours. As can be seen in Table VI, a comparison of Examples 36 and 38 with Examples 35 and 37 reveals that striking at a constant pH of 5.5 gave significantly lower mean diameters than at a constant pH of 3.5. Examples 40 and 42 involve striking in the presence of an acetate buffer, whereby the pH during striking went from 6.5 to 3.7, as the coupling reaction progressed. Surprisingly, striking at pH 6.5 to 3.7 (with acetate buffer) did not give significantly higher mean diameters than striking at a constant pH of 5.5. Lastly, from Table VI it is apparent that striking times of 20 minutes versus 50 minutes did not significantly affect mean diameters. Particulate diameter measurements and ultrasonic irradiation were performed as described in Examples 9-14.

TABLE VI

Mean Diameters of AAA Yellow Slurries: Effects of Striking pH and Striking Time

| Example Number | Striking pH | Striking Time (minutes) | Treatment Level of Duoquad ® T (wt. %) | Mean Diameter (nm) |
|---|---|---|---|---|
| 35 | 3.5 | 20 | 50 | 112; 117; 121 |
| 36 | 5.5 | 20 | 50 | 84; 88; 89 |
| 37 | 3.5 | 50 | 50 | 108; 111; 113 |
| 38 | 5.5 | 50 | 50 | 83; 87; 89 |
| 39 | 5.5 | 25 | 30 | 83; 85; 88 |
| 40 | 6.5-3.7 | 25 | 30 | 87; 95; 97 |
| 41 | 5.5 | 50 | 30 | 79; 83; 88 |
| 42 | 6.5-3.7 | 50 | 30 | 80; 85; 86 |

EXAMPLES 43-46

Table VII illustrates the effects of striking temperature and striking time on particulate diameter. The AAA Yellow slurries were struck with 0.25 molar DCB tetrazo, with pH decreasing from 6.0 to 3.5, treated with 30 percent Duoquad ®T and ultrasonically dispersed at 65°-70° C. for 3 hours. A comparison of Examples 43 and 45 with Examples 44 and 46 indicates that striking at 25° produced lower mean particulate diameters than striking at 15° C. Particulate diameter measurements and ultrasonic irradiation were performed as described in Examples 9-14.

TABLE VII

Mean Diameters of AAA Strike Slurries: Effects of Striking Temperatures and Times

| Example Number | Striking Temp. (°C.) | Striking Time (min.) | Mean Diameter (nm) |
|---|---|---|---|
| 43 | 15 | 25 | 113; 120 |
| 44 | 25 | 25 | 104; 109 |
| 45 | 15 | 45 | 125; 132 |
| 46 | 25 | 45 | 88; 93 |

EXAMPLES 47-52

Table VIII illustrates a comparison of the mean particulate diameter of AAA Yellow slurry which was freshly struck, treated with 30 percent Duoquad ®T, and exposed to ultrasonic irradiation versus the same AAA Yellow slurry which was first filtered after striking, following which the filtercake was stored for 16 hours at 20° C. in the dark before being reslurried and treated with the Duoquad ®T and ultrasonic radiation. The data given in Table VIII indicate that, in general, the slurry from the filtercake procedure gave a mean diameter 10 nanometers (nm) larger than the particulates which were irradiated immediately after striking. Even after extensive (i.e. 9 hours) of ultrasonic dispersion, the slurry from the filtercake procedure gave a mean diameter 10 nm larger than from the slurry. A similar AAA Yellow presscake stored at 20° C. in the dark for several months gave mean diameters of 329, 363, and 379 nm, much larger than those from slurries. As a result, it has been hypothesized that particulates in a pigment presscake may "weld" together, making dispersion (as least ultrasonic dispersion) difficult. Throughout Examples 47-52, particulate diameter measurements and ultrasonic irradiation were performed as described in Examples 9-14.

TABLE VIII

Mean Diameters of AAA Yellow Slurry: Treated Immediately Versus Filtered And Stored as Filtercake, then Treated

| Example Number | Hours of Ultrasonic Dispersion at 60° C. | Mean Diameter (nm) of | |
|---|---|---|---|
| | | Fresh Slurry | 16 hour Filtercake |
| 47 | 1.5 | 80; 81; 81 | 95; 98; 98 |
| 48 | 3 | 72; 73; 76 | 79; 83; 85 |
| 49 | 4.5 | 66; 71; 72 | 80; 83; 83 |
| 50 | 6 | 66; 69; 71 | 88; 85; 85 |
| 51 | 7.5 | — | 81; 81; 81 |
| 52 | 9 | — | 79; 81; 81 |

EXAMPLE 53-59

Table IX illustrates the effects of striking in the presence of three of the surfactants claimed on the mean diameters of the AAA Yellow slurries. Unlike the previous Examples, the surfactants were added before striking. Of hundreds of surfactants tested during striking AAA Yellow, these three gave the least opaque, most fluid AAA Yellow slurries. In fact, at the 55% level on pigment, the 3.5% AAA Yellow slurries were translucent. At the 85 percent level on pigment, the 3.5 AAA Yellow slurries were deep orange solutions of almost complete transparency. From Table IX, the latter slurries contained particles of mean diameters of $0.02$–$0.03\mu$. Striking in the presence of these surfactants was the only way of significantly lowering mean diameters of AAA Yellow slurries below the $0.06$–$0.10\mu$ obtained with the conventional striking conditions shown in Examples 31–46.

A preferred process of the present invention can be carried out by the use of one or more of the recommended surfactants at a level between 5 percent, on weight of pigment, and 95 percent, on weight of pigment.

TABLE IX

Mean Diameters of AAA Yellow Slurries: Effects of Striking in Presence of Surfactants

| Example Number | Surfactant Name | Level (wt. %) | Mean Diameter (nm) |
|---|---|---|---|
| 53 | Duoquad ® T | 40 | 80; 87; 90 |
| 54 | Duoquad ® T | 55 | 44; 45; 48 |
| 55 | Duoquad ® T | 85 | 32; 33; 33 |
| 56 | Duomeen ® TTM | 55 | 49; 51; 54 |
| 57 | Duomeen ® TTM | 85 | 23; 23; 25 |
| 58 | Propoduomeen ® T/13 | 55 | 66; 67; 73 |
| 59 | Propoduomeen ® T/13 | 85 | 28; 29; 29 |

EXAMPLES 60-74

A sample of an untreated copper phthalocyanine (CPC) blue presscake was obtained from Daicolor-Pope Inc. This presscake was known as PC-3004, and was found to contain 42 percent solids. Three 5.95 part aliquots of this presscake (i.e. 2.50 parts pigment) were each stirred for 24 hours with 0.25, 0.50 and 0.75 parts of N-tallow alkyl-N,N,N',N',N'-pentamethyl-1,3-propanediamine dichloride (e.g. Sherex Chemical's Adogen 477) respectively, each mixture being combined with enough water to make a total of 50 parts of mixture. Each of the resulting mixtures was then ultrasonically dispersed as described in Examples 9-14, except that 20 g. aliquots in the 1 oz. jars and a 200 W Cole-Palmer Branson Ultrasonic cleaner Model B-221 were used. Before the dispersion was subjected to particle size analysis, the dispersion was diluted 1:800 with filtered, deionized water, following which the diluted samples were placed in the sample cuvettes and ultrasonically dispersed for two minutes. The cuvettes were allowed to stand in the N4 sample chamber for 10 minutes before measurements were started. Table X provides results for these Examples. As can be seen in Table X, the CPC Blue was deflocculated to 100-110 nm after 5 hours of ultrasonic dispersion at 60° C. Furthermore, additional ultrasonic dispersion did not further decrease the resulting mean particle diameter. Also, increasing the level of Adogen 477 from 10 weight percent to 30 weight percent did not significantly change the resulting mean particle diameter.

TABLE X

Mean Diameters of CPC Blue Slurries Treated and Ultrasonically Dispersed Under Various Conditions

| Example Number | Weight Percent of Adogen 477 On Pigment | Time of Ultrasonic Dispersion at 60° C. (Hrs) | Mean Diameter (nm) |
|---|---|---|---|
| 60 | 10 | 1 | 132; 136; 139 |
| 61 | 10 | 3 | 110; 115; 118 |
| 62 | 10 | •5 | 105; 108; 112 |
| 63 | 10 | 7 | 100; 105; 109 |
| 64 | 10 | 10 | 101; 105; 104 |
| 65 | 20 | 1 | 124; 135; 142 |
| 66 | 20 | 3 | 113; 121; 123 |
| 67 | 20 | 5 | 105; 112; 112 |
| 68 | 20 | 7 | 106; 113; 111 |
| 69 | 20 | 10 | 104; 111; 111 |
| 70 | 30 | 1 | 125; 131; 134 |
| 71 | 30 | 3 | 113; 122; 120 |
| 72 | 30 | 5 | 107; 110; 113 |
| 73 | 30 | 7 | 108; 111; 109 |
| 74 | 30 | 10 | 105; 110; 109 |

EXAMPLES 75-78

The procedure of Examples 60-74 was again followed in general, except that the surfactant was utilized at 20 percent (on a pigment weight basis). Furthermore, Examples 77 and 78 utilized Mazer Chemical's nonionic Macol CSA-10 (a hexadecyl/octadecyl alcohol adduct with 10 moles of ethylene oxide). Also, in Examples 76 and 78, the ultrasonic irradiation was carried out at 20°-25° C. The Adogen 477 produced approximately the same mean particle diameter at 20° C. as at 60° C., whereas the Macol CSA-10 gave a much lower mean diameter at 20° C. than at 60° C. However, even at 20° C. the Adogen 477 enabled deflocculation to lower mean particle diameters than did Macol CSA-10.

TABLE XI

Mean Diameter of CPC Blue Slurry Treated and Ultrasonically Dispersed Under Various Conditions

| Example Number | Surfactant (20% on weight pigment) | Ultrasonic Dispersion Conditions | | Mean Particle Diameter (nm) |
|---|---|---|---|---|
| | | Temperature (°C.) | Time (hours) | |
| 75 | Adogen 477 | 60 | 10 | 104; 108; 110 |
| 76 | Adogen 477 | 20 | 10 | 104; 111; 112 |
| 77 | Macol CSA-10 | 60 | 10 | 155; 163; 169 |
| 78 | Macol CSA-10 | 20 | 10 | 119; 125; 126 |

EXAMPLES 79-94

The procedure of Examples 75-78 was repeated, except that several other nonionic surfactants with HLB (Hydrophilic-Lipophilic Balance) of 11.1-12.4 were substituted for the Macol CSA-10. The temperature of the water in the ultrasonic bath was maintained at 20°-25° C. by intermittent additions of ice. Table XII provides the results of these experiments. BRIJ 76 (manufactured by ICI), the adduct of octadecyl alcohol with 10 moles of ethylene oxide, gave somewhat lower mean diameters than Macol CSA-10, but still 10-20 nm higher than with Adogen 477. The other nonionic surfactants listed in Table XII gave still higher mean diameters. Furthermore, none of the nonionic surfactants produced the low mean diameters achieved by the cationic N-tallow alkyl-N,N,N'N'-pentamethyl-1,3-propanediamine dichloride (Adogen 477).

TABLE XII

Mean Diameters of CPC Blue Slurry Treated And Ultrasonically Dispersed at 20° C. for 5 or 10 Hours

| Example Number | Surfactant Used (20 wt. % on pigment) Name | HLB | Ultrasonic Time (hrs) | Mean Particle Diameter (nm) |
|---|---|---|---|---|
| 79 | Macol CSA-10 | 12.6 | 5 | 139; 153; 145 |
| 80 | Macol CSA-10 | 12.6 | 10 | 132; 134; 136 |
| 81 | BRIJ 76 | 12.4 | 5 | 129; 137; 137 |
| 82 | BRIJ 76 | 12.4 | 10 | 114; 121; 127 |
| 83 | BRIJ 96 | 12.4 | 5 | 127; 139; 142 |
| 84 | BRIJ 96 | 12.4 | 10 | 126; 135; 137 |
| 85 | Chemax CO-36 | 12.6 | 10 | 156; 154; 157 |
| 86 | Triton X-114 | 12.4 | 10 | 142; 178; 248 |
| 87 | Chemax E-400MS | 12.0 | 10 | 388; 501; 657 |
| 88 | Pluronic L43 | 12.0 | 10 | 273; 319; 362 |
| 89 | Chemax E-400MO | 11.8 | 10 | 256; 256; 254 |
| 90 | Chemax CO-30 | 11.7 | 10 | 203; 201; 203 |
| 91 | Chemax TO-10 | 11.5 | 10 | 200; 199; 195 |
| 92 | MYRJ 45 | 11.1 | 10 | 465; 707; 796 |
| 93 | Sorbax PTO-20 | 11.0 | 10 | 150; 162; 399 |
| 94 | Pluronic L63 | 11.0 | 10 | 283; 566; 1270 |

EXAMPLES 95-110

The procedure of Examples 79-94 was followed, except that three amine-containing surfactants (dissolved in dilute acetic acid and adjusted to pH 5.3-6.0 with acetic acid) were substituted for the nonionic surfactants. Table XIII shows that these cationic surfactants produced lower mean diameters than the nonionic surfactants of Examples 79-94 and were surprisingly almost as effective deflocculants as Adogen 477. Furthermore, one nonionic surfactant (Chemal OA-9) produced mean diameters essentially as low as the three cationic surfactants. This surfactant, with an HLB (11.9) in the middle of the range of the less effective deflocculants of Table XII, was surprisingly effective. It was surprisingly found that surfactants with only one more mole of ethylene oxide (i.e. 10 vs. 9 moles EO), such as BRIJ 96, BRIJ 76, Macol CSA-10 and Chemax TO-10, were not nearly as effective deflocculants. Also, changing the connecting group between the 9-octadecenyl group and the 9 mole polyethylene oxide group from the ether connecting group of Chemal OA-9 to the ester group of Chemax E-400MO had a surprisingly deleterious effect on deflocculating efficiency (compare Example 110 vs. 89). There was a surprising deflocculating efficiency of the combination of a $C_{18}$ hydrocarbon tail connected by an ether group to a polyethylene glycol head made with 9 moles ethylene oxide. These three cationic surfactants, together with one nonionic surfactant, were almost as effective as Adogen 477 (Compare Example 76 against Examples 98, 102, 106 and 110).

TABLE XIII

Mean Diameters of CPC Blue Slurry Treated and Ultrasonically Dispersions at 20° C. for Various Times

| Example Number | Surfactant Used At 20 wt. percent on Pigment | Ultrasonic Dispersion Time (hrs) | Mean Diameter (nm) |
|---|---|---|---|
| 95 | Duomeen TTM | 3 | 114; 120; 118 |
| 96 | Duomeen TTM | 5 | 114; 118; 116 |
| 97 | Duomeen TTM | 7 | 113; 115; 114 |
| 98 | Duomeen TTM | 10 | 111; 109; 112 |
| 99 | Propoduomeen T/13 | 3 | 124; 126; 128 |
| 100 | Propoduomeen T/13 | 5 | 114; 118; 123 |
| 101 | Propoduomeen T/13 | 7 | 119; 116; 122 |
| 102 | Propoduomeen T/13 | 10 | 112; 115; 114 |
| 103 | Jetamine TET | 3 | 129; 124; 129 |
| 104 | Jetamine TET | 5 | 121; 120; 118 |
| 105 | Jetamine TET | 7 | 113; 118; 118 |
| 106 | Jetamine TET | 10 | 113; 118; 118 |
| 107 | Chemal OA-9 | 3 | 123; 127; 129 |
| 108 | Chemal OA-9 | 5 | 117; 115; 113 |
| 109 | Chemal OA-9 | 7 | 119; 122; 122 |
| 110 | Chemal OA-9 | 10 | 115; 119; 120 |

The embodiments of the invention in which an exclusive privilege or property is claimed are defined as follows:

1. A method of dispersing an organic pigment, the method comprising the steps of:
   (A) adding a surfactant to an aqueous slurry of an organic pigment, the surfactant being selected from the group consisting of:
   1. an acidic salt of N-alkyl-N,N'-trimethyl-1,3-propanediamine, wherein the alkyl group contains from about 12 to about 22 carbon atoms, as well as triethyl and tripropyl derivatives thereof;
   2. an acidic salt of N-alkyl-N,N',N'-tris(2-hydroxy propyl)-1,3-propanediamine, wherein the alkyl group contains from about 12 to about 22 carbon atoms, as well as 2-hydroxyethyl and 2-hydroxybutyl derivatives thereof;
   3. a quaternary salt of N-alkyl-N,N,N',N',N'-pentamethyl-1,3-propanediamine, wherein the alkyl group contains from about 12 to 22 carbon atoms, as well as pentaethyl and pentapropyl derivatives thereof;
   4. an acidic salt of N-alkyl-N'-(3-aminopropane)-1,3-propanediamine, wherein the alkyl group contains from about 12 to about 22 carbon atoms, as well as tetramethyl, tetraethyl, tetrapropyl, tetrakis(2-hydroxy ethyl), tetrakis(2-hydroxy propyl), tetrakis(2-hydroxybutyl), heptamethyl, heptaethyl, and heptapropyl derivatives thereof;
   5. an acidic salt of N-alkyl-N-(3-aminopropane)-1,3-propanediamine, wherein the alkyl group contains from about 12 to about 22 carbon atoms, as well as tetramethyl, tetraethyl, tetrapropyl, tetrakis(2-hydroxyethyl), tetrakis(2-hydroxypropyl), tetrakis-(2-hydoxy- butyl), heptamethyl, heptaethyl, and heptapropyl derivatives thereof;

6. an acid salt of N-(N-alkyl-3-aminoprpane)-N'-(3-aminopropane)-1,3-propanediamine, wherein the alkyl group contains about 12 to about 22 carbon atoms, as well as pentamethyl, pentaethyl, pentapropyl, pentakis (2-hydroxyethyl), pentakis(2-hydroxypropyl), pentakis (2-hydroxybutyl), nonamethyl, nonaethyl, and nonapropyl derivatives thereof; and 7. a poly(ethyleneoxide) ether of an 18 carbon alcohol having 9 units of ethylene oxide thereon; and (B) dispersing the pigment by subjecting the slurry to ultrasonic radiation.

2. The method as described in claim 1, wherein the surfactant is selected from the group consisting of:

1. an acidic salt of N-alkyl-N,N',N'-trimethyl-1,3-propanediamine, wherein the alkyl group contains from about 12 to about 22 carbon atoms, as well as triethyl and tripropyl derivatives thereof;

2. an acidic salt of N-alkyl-N',N'-tris(2-hydroxypropyl)-1,3-propanediamine, wherein the alkyl group contains from about 12 to about 22 carbon atoms, as well as 2-hydroxyethyl and 2-hydroxybutyl derivatives thereof;

3. a quaternary salt of N-alkyl-N,N,N',N',N'-pentamethyl-1,3-propanediamine, wherein the alkyl group contains from about 12 to about 22 carbon atoms, as well as pentaethyl and pentapropyl derivatives thereof;

4. an acidic salt of N-alkyl-N'-(3-aminopropane)-1,3-propanediamine, wherein the alkyl group contains from about 12 to about 22 carbon atoms, as well as tetramethyl, tetraethyl, tetrapropyl, tetrakis(2-hydroxyethyl), tetrakis(2-hydroxypropyl), tetrakis(2-hydroxybutyl), heptamethyl, heptaethyl, and heptapropyl derivatives thereof;

5. an acidic salt of N-alkyl-N-(3-aminopropane)-1,3-propanediamine, wherein the alkyl group contains from about 12 to 22 carbon atoms, as well as tetramethyl, tetraethyl, tetrapropyl, tetrakis(2-hydroxyethyl), tetrakis(2-hydroxypropyl), tetrakis(2-hydroxybutyl), heptamethyl, heptaethyl, and heptapropyl derivatives thereof;

6. an acidic salt of N-(N-alkyl-3-aminopropane)-N'-(3-aminopropane)-1,3-propanediamine, wherein the alkyl group contains about 12 to about 22 carbon atoms, as well as pentamethyl, pentaethyl, pentapropyl, pentakis(2-hydroxyethyl), pentakis(2-hydroxypropyl), pentakis(2-hydroxybutyl), nonamethyl, nonaethyl, and nonapropyl derivatives thereof.

3. The method as described in claim 1 wherein the dispersion of the pigment particles is carried out at a temperature between 15° C. and the boiling point of the pigment slurry.

4. The method as described in claim 1 wherein the dispersing step is carried out for a period less than 5 hours.

5. The method as described in claim 1 wherein the dispersing step is carried out for a period between 30 minutes and 5 hours.

6. The method as described in claim 1 wherein the surfactant is added to the pigment slurry in an amount between 2 percent, on weight of pigment, and 100 percent, on weight of pigment.

7. The method as described in claim 1 wherein the surfactant is added to the pigment slurry in an amount between 5 percent, on weight of pigment and 85 percent on weight of pigment.

8. The method as described in claim 1 wherein the surfactant is added to the pigment slurry in an amount between 10 percent, on weight of pigment, and 30 percent, on weight of pigment.

9. The method as described in claim 1 wherein the pigment is a substantially transparent pigment and the surfactant is added in an amount between 10 percent, on weight of pigment, and 30 percent, on weight of pigment.

10. The method as described in claim 1 wherein the pigment is a substantially opaque pigment and the surfactant is added in an amount between 5 percent, on weight of pigment, and 10 percent, on weight of pigment.

11. The method as described in claim 1 wherein the surfactant is present in an amount between 50 percent, on weight of pigment, and 90 percent, on weight of pigment, and the dispersing process is carried out during the striking of the pigment.

12. The method as described in claim 1 wherein the pigment is one or more members selected from the group consisting of nitroso pigments, disazo pigments, disazo condensation pigments, basic dye pigments, alkali blue pigments, Peacock blue lake pigments, phloxine pigments, quinacridone pigments, lake pigments of Acid Yellow 1 and 3, carbazole dioxazine violet pigments, alizarine lake pigments, vat pigments, phthalocyanine pigments, carmine lake pigments, tetrachloroisoindolinone pigments, and carbon black pigments.

13. The method as described in claim 1 wherein the pigment is one or more members selected from the group consisting of monoazo, disazo, phthalocyanine, and carbon black pigments.

14. The method as described in claim 1 wherein the organic pigment is selected from the group consisting of Pigment Yellow 12, Pigment Blue 15, Pigment Black 7, and Pigment Red 49.

15. The method as described in claim 2 wherein the dispersion of the pigment particles is carried out at a temperature between 15° C. and the boiling point of the pigment slurry.

16. The method as described in claim 2 wherein the dispersing step is carried out for a period less than 5 hours.

17. The method as described in claim 2 wherein the dispersing step is carried out for a period between 30 minutes and 5 hours.

18. The method as described in claim 2 wherein the surfactant is added to the pigment slurry in an amount between 2 percent, on weight of pigment, and 100 percent, on weight of pigment.

19. The method as described in claim 2 wherein the surfactant is added to the pigment slurry in an amount between 5 percent, on weight of pigment and 85 percent on weight of pigment.

20. The method as described in claim 2 wherein the surfactant is added to the pigment slurry in an amount between 10 percent, on weight of pigment, and 30 percent, on weight of pigment.

21. The method as described in claim 2 wherein the pigment is one or more members selected from the group consisting of nitroso pigments, disazo pigments, disazo condensation pigments, basic dye pigments, alkali blue pigments, Peacock blue lake pigments, phloxine pigments, quinacridone pigments, lake pigments of Acid Yellow 1 and 3, carbazole dioxazine violet pigments, alizarine lake pigments, vat pigments, phthalocyanine pigments, carmine lake pigments, tetrachloroisoindolinone pigments, and carbon black pigments.

22. The method of claim 2 wherein the pigment is one or more members selected from the group consisting of monoazo, disazo, phthalocyanine, and carbon black pigments.

23. The method of claim 2 wherein the organic pigment is selected from the group consisting of Pigment Yellow 12, Pigment Blue 15, Pigment Black 7, and Pigment Red 49.

24. The method as described in claim 2 wherein the pigment is a substantially transparent pigment and the surfactant is added in an amount between 10 percent, on weight of pigment, and 30 percent, on weight of pigment.

25. The method as described in claim 2 wherein the pigment is a substantially opaque pigment and the surfactant is added in an amount between 5 percent, on weight of pigment, and 10 percent, on weight of pigment.

26. The method as described in claim 2 wherein the surfactant is present in an amount between 50 percent, on weight of pigment, and 90 percent, on weight of pigment, and the dispersing process is carried out during the striking of the pigment.

* * * * *